Figure 1:
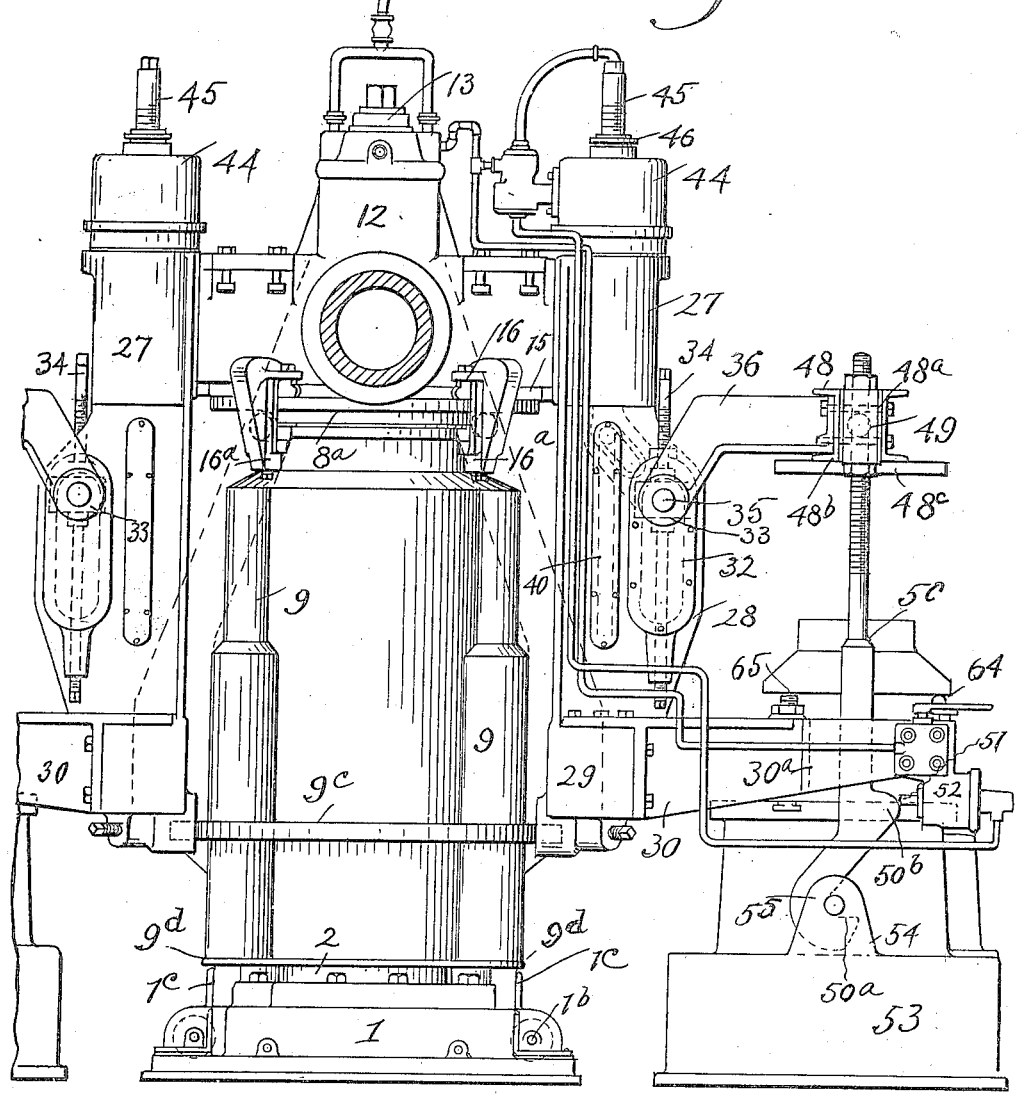

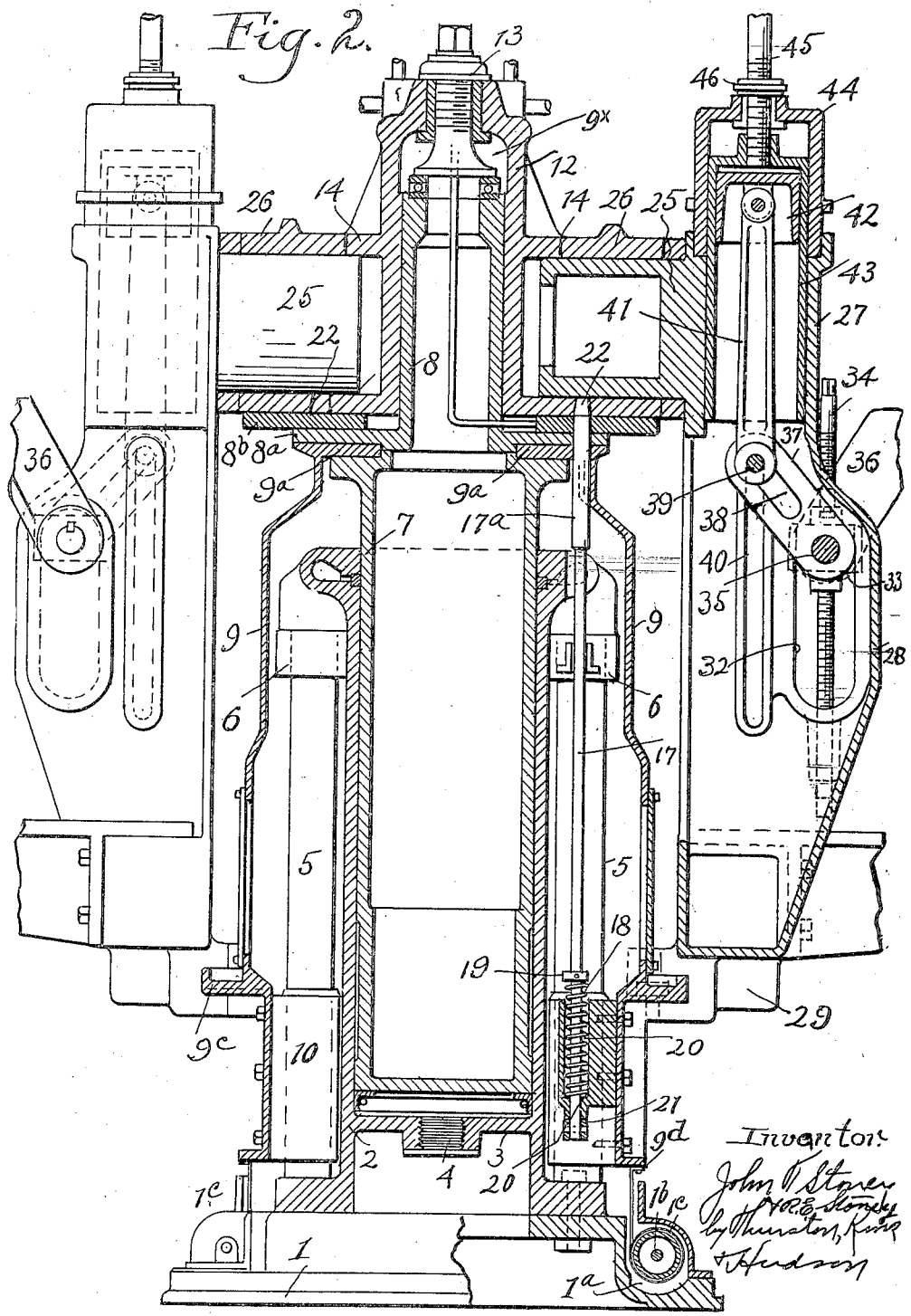

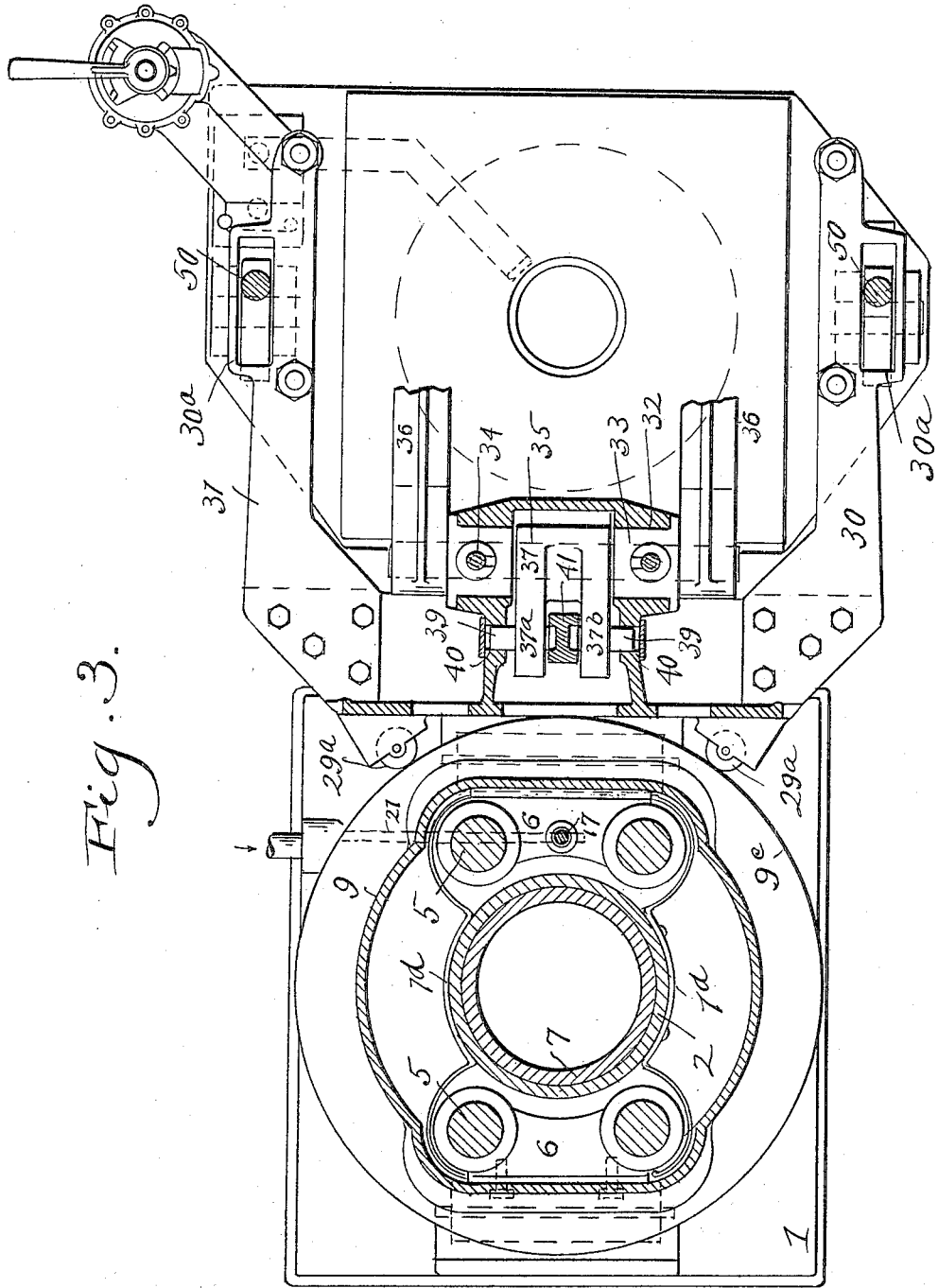

Oct. 9, 1923.
J. T. STONEY ET AL
1,470,402
MOLDING MACHINE
Filed May 19, 1920   6 Sheets-Sheet 4
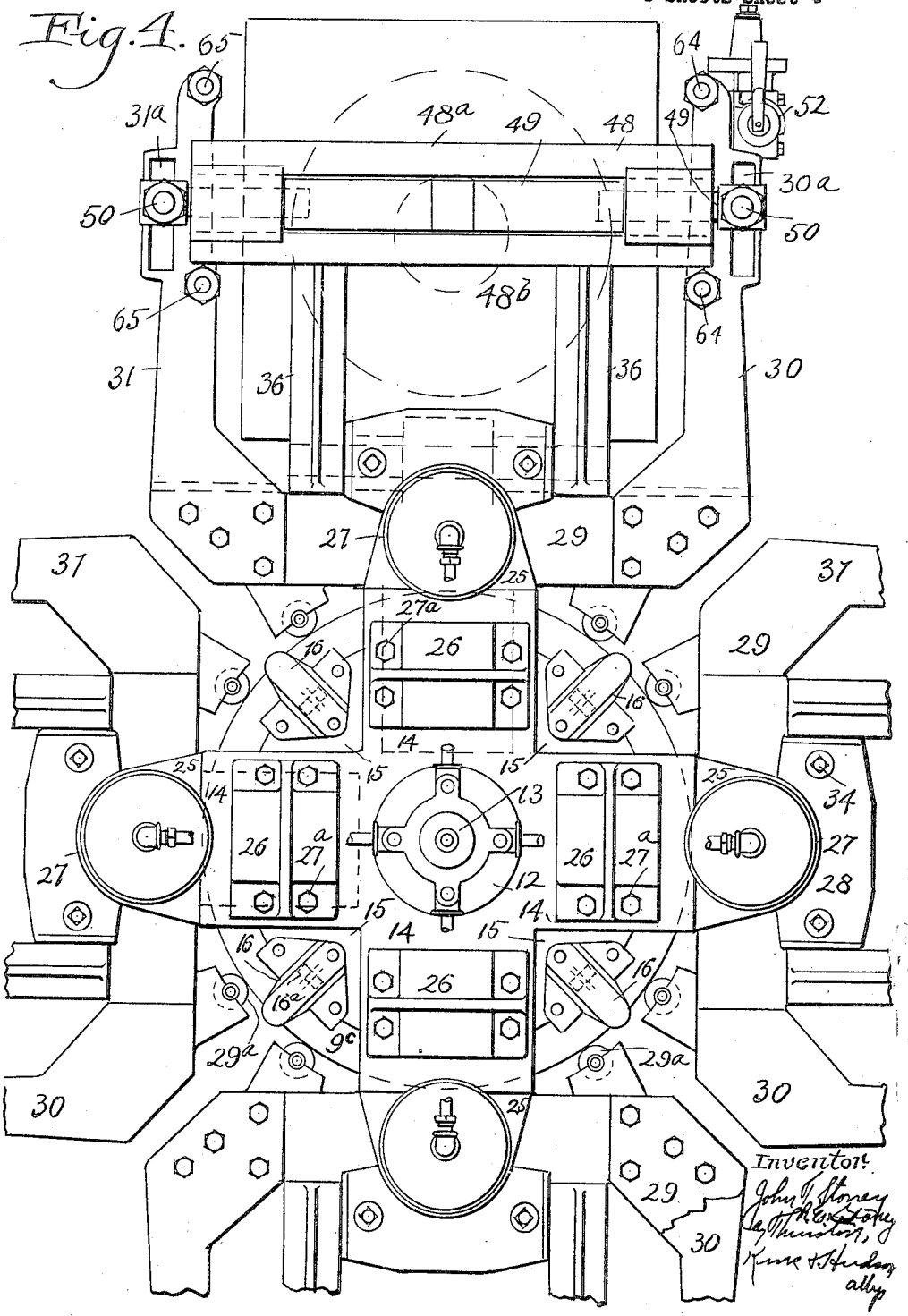

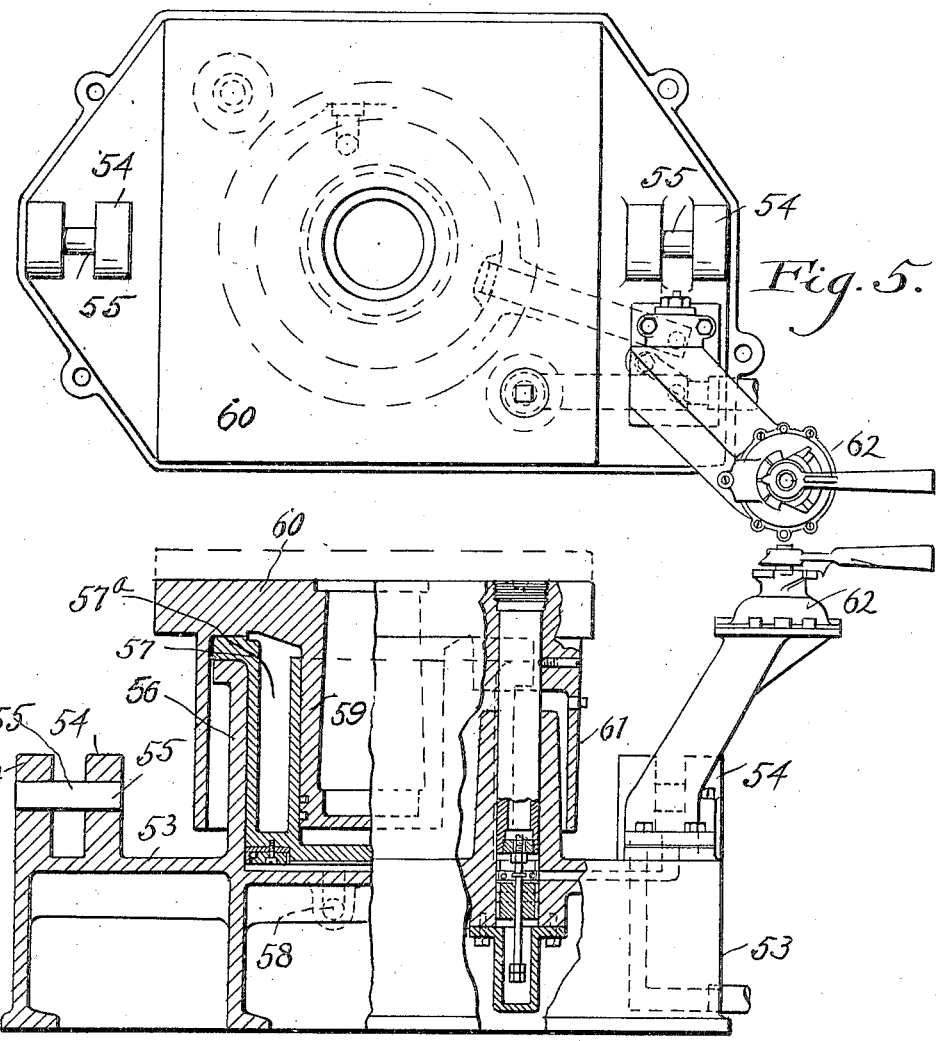

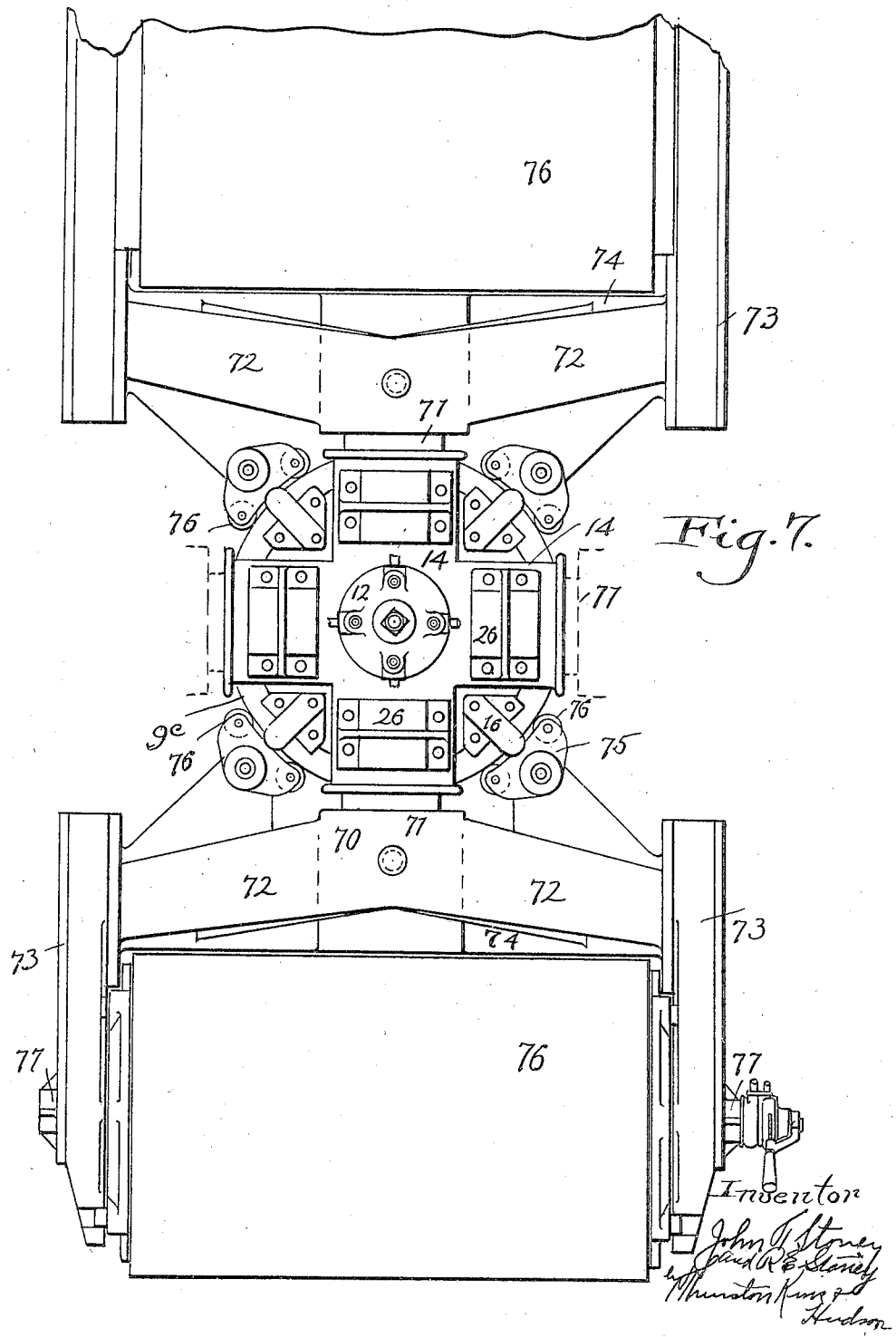

Patented Oct. 9, 1923.

1,470,402

UNITED STATES PATENT OFFICE.

JOHN T. STONEY AND RAYMOND E. STONEY, OF CLEVELAND, OHIO.

MOLDING MACHINE.

Application filed May 19, 1920. Serial No. 382,509.

*To all whom it may concern:*

Be it known that we, JOHN T. STONEY and RAYMOND E. STONEY, citizens of the United States, and residents, respectively, of Cleveland, in the county of Cuyahoga and State of Ohio, and Cleveland, in the county of Cuyahoga and State of Ohio, have invented a certain new and useful Improvement in Molding Machines, of which the following is a full, clear, and exact description.

The present invention relates to molding machines.

The object of the invention is to provide a machine which has a multiple of operating or molding stations so that a plurality of molds may be prepared at the same time, and furthermore is so constructed that the main portion of the machine is rotatable upon a central axis whereby the molding mechanisms are brought into successive relationship with the molding stations.

Other objects of the invention will appear more at large as the description proceeds.

Reference should be had to the accompanying drawings in which Fig. 1 is an elevation of the machine, portions being shown in section; Fig. 2 is essentially a sectional elevation of the machine; Fig. 3 is a transverse section of the machine; Fig. 4 is a top plan view of the machine; Fig. 5 is a top plan view of a jarring and squeezing mechanism; Fig. 6 is a sectional elevation of the showing in Fig. 5; Fig. 7 is a top plan view of a modification.

Referring to the drawings, 1 indicates a base casting to which is secured an upright cylinder 2. This cylinder is open at its upper end and is closed at its lower end by a head 3 which is provided with an opening 4 to which opening is attached a suitable pipe, not shown, by which air or other fluid under pressure may be admitted within the cylinder 2, for purposes which will be later described. Extending upwardly from the base are a plurality of upright guides 5. These guides at their upper ends are secured to the cylinder 2 and the member 6 which is secured to the cylinder 2 slides upon the guides 5.

Within the cylinder 2 there is a piston 7 and at the upper end of the piston 7 there is an upright member 8 which is hollow and at its upper end supports a thrust bearing 9ˣ. The upright member 8 is provided with an outwardly extending flange 8ª at the lower portion thereof which overlies a flange portion 9ª of a depending skirt or housing 9. This depending housing 9 extends upon the outside of the upright guides 5 and at its lower end is provided with sleeves 10 which engage with the upright guides 5 so that when the piston 7 is raised the depending member 9 is guided in its upward movement both by the sleeves 10 and its engagement with the upper end of the piston 7.

In the base 1 there is a part indicated at 1ª which receives a roller or mandrel 1ᵇ to which there is secured two flexible curtains 1ᶜ. The free end of the curtains are secured at 9ᵈ. These curtains cooperate with dust shields 1ᵈ as shown in Fig. 3, and as the housing 9 is raised the curtains follow it and so excludes sand and dirt from coming in contact with the guide members 5 and from the interior of the depending housing 9. The curtain may be mounted upon a spring retention roller so that the curtain is rewound as the housing 9 descends.

Mounted upon the upright member 8 is a cylindrical member 12. This member is provided at the upper end thereof with an adjustable member 13 which is mounted in a threaded bushing at the end of the member 12. The member 13 bears against the thrust bearing 9ˣ. The member 12 is provided with a plurality of hollow extensions 14 which extends at substantially right angles with respect to the member 12. Joining these extensions is a web or plate 15 which bears against the upper side of a plate 8ᵇ which is bolted to the flanges 8ª of the upright member 8.

Mounted upon this web 15 at portions thereof which lie between the extensions 14 are brackets 16 which brackets extend over the sides of the web 15 and plate 8ᵇ and at their lower portions are provided with an inwardly extending part 16ª which extends beneath the outer edge of the plate 8ᵇ. These inwardly extending portions 16ª have a bearing on the under side of the plate 8ᵇ and have a sliding or rolling engagement with the plate as the cylinderical member 12 and the parts associated therewith are turned, as will be later described. These brackets assist in holding the cylindrical member 12 and the parts associated therewith during the turning movement thereof and overcome any binding action which might occur as the cylindrical member 12 is turned on the upright member 8.

As will be seen, the head which comprises the cylindrical member 12 and the parts associated therewith, has a bearing on the plate 8[b] which is secured to the flanges 8[a] which part is stationary and also has a bearing through the threaded member 13 upon the thrust bearing 9[x]. The weight of the head and the parts which it carries as later described is principally borne upon the thrust bearing 9[x] and therefore the member 13 which engages with the thrust bearing is adjustable in a threaded bushing carried at the outer end of the cylindrical member 12 so as to support the head and parts carried thereby in a manner which will permit of their easy rotation.

Within the depending housing 9 there is located a rod 17 which at its lower end is mounted adjacent or in connection with one of the sleeves 10. The rod is surrounded by a spring 18, which spring bears against a collar 19 fastened to the rod at one end thereof and at its lower end bears on lower part of the bracket 10 in which it is mounted, as indicated at 20.

This spring normally urges the rod 18 in an upward direction. The lower end of the rod has secured thereto a lever 21 which extends outside of the depending housing 9 and in position to be manipulated by the operator of the machine. The rod 17 is provided with an end portion 17[a] which extends through a suitable opening in the flange 9[a] of the housing 9 and also the flange 8[a] of the upright member 8, the plate 8[b] and the web 15 which joins the members 14 and forms a part of the rotatable head is provided with a series of openings, one of which is indicated at 22. When the end 17[a] of the rod occupies one of the openings 22, the rotatable head is held against rotation, and when it is desired to rotate the rotatable head, the engagement of the rod 17 must be released.

In the present machine which is adapted to carry four molding mechanisms, as later described, there are four equally spaced openings, such as the opening 22, and as will be understood, the number of openings, such as the opening 22, will be the same as the number of molding mechanisms which the machine carries.

In the present machine the head may be moved 90° when the rod 17 is withdrawn, and when the head in its rotation moves, the rod 17 is held under spring pressure so that it will automatically be extended into and engage with the succeeding opening 22 and so arrest further movement of the head.

The positioning of the head is a matter of some importance, as will be later described, as each molding mechanism carried by the head must position itself correctly with respect to a jarring and raising mechanism with which it is adapted to cooperate.

The downwardly extending housing 9 is at a point above the lower end thereof, provided with an outwardly extending annular member 9[c], which forms a trackway, the purpose of which will be later described.

Four cylindrical extensions, as indicated at 14, are carried by the cylindrical member 12, but it will be understood that a greater or less number of such extensions may be provided. Whatever the number of extensions 14 may be, they are symmetrically arranged with respect to each other so as to eliminate as far as possible any unequal overhanging with respect to the upright member 8 and thus eliminate binding action when the head is turned.

Each of the extensions 14 is adapted to receive and support a mold mechanism. In the present instance each of the molding mechanisms are alike, and therefore a description of one will suffice for all. Each molding mechanism comprises a head which is indicated at 25. This head is adapted to fit within one of the hollow extensions 14 and this head is clamped in position by means of a plate 26 which cooperates with an opening formed in the upper portion of the extension 14. The plate 26 is secured to the extension 14 by means of bolts such as indicated at 27[a], (see Fig. 4), which prevent turning movement of the head 25 when once the straps or plates 26 are secured.

The head 25 is formed as a part of a body portion which has a hollow cylindrical upper portion 27 and an intermediate hollow portion 28 and a lower or base portion 29 to which there are secured outwardly extending arms 30 and 31, these arms being spaced apart, as indicated in Fig. 4. The various parts 25, 27, 28, 29 and 30 are all in effect an integral structure. The base portion 29 at points at the rear portions of the arms 30 and 31, carry rollers 29[a] which engage with the track member 9[c] carried by the housing 9. This holds the lower end of molding mechanism in spaced relation to the central portion of the molding machine, forms a point of support for the lower end of the molding mechanism to prevent overhang on the extension 25.

In the side walls of the intermediate portion 28 there are slots or elongated openings 32. These openings 32 have straight side walls, and cooperating with these walls are bearing blocks 33, the bearing blocks having straight sides which cooperate with the straight sides of the openings 32 and so prevent rotation. Each of these blocks are mounted upon a threaded rod 34 which is mounted in the part 28 and by manipulation of the threaded rods 34, the bearing blocks 33 may be moved up or down and positioned as required, as will be later described. Extending transversely between the bearing blocks 33 is a shaft 35 which extends beyond the portion 28 and at the outer ends of the shaft there are secured arms such as indicated at 36. These arms in the present instance are formed to have parts which extend at an angle with respect to each other, this being for the purpose of bringing the outer ends of the arms 36 into a parallel position with respect to the lower arms 30 and 31 when a squeezing operation on the mold is being performed, as will be later described, and also is for the purpose of moving the ends of the arms 36 backward and out of the way when the squeezing operation is not being performed and thereby providing an open space above the flask to permit of the easy introduction of sand into the flask.

Secured to the shaft 35 at substantially the central portion thereof is a member 37, this member being provided with a pair of arms $37^a$ and $37^b$ (see Fig. 3).

Each of the arms adjacent the outer end thereof is provided with a slot 38 (see Fig. 2). Extending through this slot in each arm is a pin 39, the pin extending beyond the arms and extending into slots 40 which are formed in the side walls of the portion 28.

Pivotally mounted upon the pin 39 intermediate the arms of the member 37 is a piston rod 41 which at its opposite end is pivotally connected to a piston 42.

The piston 42 is mounted within a cylinder 43, which cylinder extends through the hollow part 27 and is adjustable therein.

Extending upward from the hollow part 27 is a cap portion 44 which is mounted upon the part 27 and the adjustable cylinder 43 extending up into this cap 44. To the end of the cylinder there is secured a threaded rod 45, which extends through a threaded bushing 46 in the end of cap 44, therefore by turning the threaded member 46, the position of the cylinder 43 may be adjusted.

The provision of the foregoing mechanism is for the purpose of effecting adjustment as to height of the arms 36, and the necessity for which adjustment will be apparent as the description proceeds.

It will be obvious that by turning the screws 34 the height of the arms may be varied within the limits provided by the extent of the openings 32 in which the bearing blocks 33 slide. An adjustment of the bearing blocks will obviously carry with it a movement of the piston 42 and it is necessary to adjust the cylinder 43 which cooperates with the piston 42 to compensate for such adjustment, otherwise it will be necessary to admit air to a large space above the piston 42. By manipulating the bushing 46 the cylinder 43 may be adjusted so as to compensate for any movement which the piston 42 may have.

When air or other fluid is admitted into the cylinder 43 behind the piston 42, it depresses the piston which forces down the member 37, which turns the shaft 35 and thereby elevates the ends of the arms 36 about the shaft 35 as a pivoted point. When the air is exhausted from behind the piston 42, the arms 36 return to their initial position.

Supported at the ends of the arms 36 is a transversely extending frame structure which is generally indicated at 48. This member being made up of channel members $48^a$ and $48^b$ (see Fig. 1) which are secured to the arms 36 and extend beyond the arms. The structure 48 supports a transversely extending shaft 49 which at its ends supports depending hook members indicated at 50. These hook members have a threaded engagement with the frame 48 and may be adjusted with respect thereto. The arms 30 and 31 which lie in a plane below the arms 36 are provided with openings such as indicated at $30^a$ and $31^a$ (see Fig. 4), and through these openings the hooks 50 depend.

These hook members 50 are supplied with a hook portion proper, as indicated at $50^a$ and above the hook portion proper there is a shoulder $50^b$ which is adapted to be engaged by a pushing member 51 which is operated by an air cylinder 52. This member 51 is operated to push the hooks 50 rearwardly during certain portions of the operation of the device, as will be later explained.

A squeeze plate $48^c$ is secured to the underside of the structure 48 and is adapted to compress the sand in a flask as later described.

As before described, in the present machine there are four such molding mechanisms, associated with the central rotatable head, and there is also associated with the molding mechanisms and positioned so as to be successively in cooperation with the same, a plurality of jarring mechanisms. The number of jarring mechanisms which are used, is dependent upon the number of molding stations which are utilized. In the present machine it is proposed to utilize two molding stations which are diametrically opposed and when any given molding mechanism is in intermediate position between the molding stations, a prepared mold may be removed from such molding mechanism and an empty flask substituted therefor so as to be in position ready for operation when the molding mechanism is given a succeeding quarter turn.

This particular arrangement is a desirable one, although not a necessary one, and obviously the machine of this invention may be used in connection with a single molding station or there may be as many molding stations provided as there are mold mechanisms which form parts of the present machine.

The jarring mechanisms which are used are positioned so as to lie beneath the arms 30 and 31 when the rotatable head of the molding machine has been indexed and is in position for a molding operation.

In Figs. 5 and 6 there is shown a jarring mechanism. This comprises a base portion 53 which is permanently set in position. At the opposite ends of this base portion 53 there are pairs of spaced upstanding ears or flanges 54 and a pin 55 extends between each pair of flanges. These pins 55 are positioned so that the pins may be engaged by the hooks 50 during the squeezing portion of the molding operation and so form and secure resistance to upward movement of the arms 36 during the squeezing operation. The base 53 has an upstanding cylindrical portion 56 which is adapted to receive a hollow piston 57 and provision is made, as indicated at 58 for the introduction of air or other fluid beneath the hollow piston 57 so that this piston may be elevated.

The hollow piston 57 has formed integrally therewith an inner upstanding cylindrical portion 57$^a$ within which is a piston 59. This piston at its upper end carries a table 60. The table adjacent its outer edge is provided with a depending flange or skirt 61 which surrounds the cylinder 56.

The underside of the table 60 rests upon a flange 57$^a$ which is at the upper end of the hollow piston 57 and this flange 57$^a$ overlies the flanged top portion of the cylinder 56. This structure which has just been described forms an abutment against which the table 60 may impact as it is raised and lowered during the jarring operation. Air is admitted beneath the piston 59 by suitable conduits controlled by the valve mechanism which is generally indicated at 62. So far as the present machine is concerned, this valve mechanism may be of any desired type and there are many such valve mechanisms which may be utilized and any one is suitable which will admit and exhaust air beneath the piston 59 to accomplish the jarring operation and which will admit and exhaust air beneath the piston 57 for the purpose of raising the piston and lowering the same when necessary as a part of the molding operation.

It will be obvious from the drawing and the description that when air is admitted beneath the piston 58 it will raise the molding table 60 and when the air is exhausted the molding table will return to its initial or lowermost position.

In operating the device a pattern is secured on top of the table 60 and a stripping plate having an opening which conforms to the pattern is secured at the end portions thereof to studs 64 and 65 which are carried by the arms 30 and 31 respectively. The stripping plate is so secured with respect to the studs 64 and 65 that it may have a limited amount of up and down movement in order to accommodate the movement of the table 60 under the jarring operation. The studs 64 and 65 while permitting this limited amount of movement hold the stripping plate against any turning movement.

A flask is placed upon the stripping plate and fastened upon centering pins as is usual practice.

In the initial stages of a molding operation the hooks 50 are in disengaged position and the arms 36 are in elevated position, which causes the hooks 50 to move backwardly and out of the way. The hooks 50 will at all times hang in a vertical position because they are so mounted as to be free to turn upon the shaft 49 upon which they are mounted.

At the beginning of the molding operation the stripping plate rests upon the molding table 60 and when the flasks are secured upon the stripping plate, sand is introduced into the flask and initially compacted around the pattern. The flask is then filled with sand and the table 60 is jarred.

After the jarring operation the arms 36 are caused to move to their horizontal position and the hooks 50 are brought into engagement with the pins 55. This operation also positions the squeeze plate 48$^c$ directly above the flask. Air is admitted beneath the piston 57 which raises the table 60 and the flask is brought into cooperative relation with the squeeze plate 48$^c$ which is carried by the frame structure 48. The table 60 is then caused to be lowered and air is admitted behind the piston 42 for the purpose of elevating the arms 36.

As air is admitted behind the piston 42, air is at the same time admitted to the cylinder 52 which causes the rod 51 to move forward and engage with the shoulders 50$^b$ upon the hooks, pushing them back and out of engagement with the pins 55. As a matter of fact the operation is so timed that the hooks are pushed back just in advance of the movement of the arms 36.

The next operation is to admit air beneath the piston 7 and this operation elevates the piston 7 and all the members supported thereby, to wit: the central upstanding member 8 and the head which is rotatably supported on the upstanding member 8. This elevating operation carries the arms 30 and 31 which support the stripping plate in an upward direction and draws the mold from the pattern which is carried by the table 60.

The head and the molding mechanisms are then in position to be rotated about the upstanding member 8 and this is possible because in the elevating operation before described the web 15 is released from the retaining rod 17, when the collar 19 strikes the member 6 through an opening in which the rod extends as shown in Fig. 2. The head and the parts carried thereby are moved until a succeeding molding mechanism is brought into proper position with respect to the jarring mechanism and when the air is exhausted from beneath the piston 7 the whole apparatus is in position for a subsequent molding operation.

The head is properly positioned after a rotation by the engagement of the rod 17 with an opening in the web 15, which as before stated, serves not only to properly position the head but also prevent rotation thereof during the molding operation.

In Fig. 7 there is shown a top plan view of a molding machine which embodies a modification over that previously described in so far as the molding mechanism employed with the central rotating head is concerned.

In the molding machine exemplified in Fig. 7 the same central structure, that is to say the base 1, cylinder 2, piston 7, rotatable head having the extending arms 14 is precisely the same as heretofore described. The molding mechanism here shown comprises a head 70 having an extension 71 which is adapted to cooperate with one of the hollow arms 14 and is held in position by means of the straps 26 the same as described with respect to the previous construction.

Extending from the head are diagonal members 72 which at their lower ends are connected with outwardly extending arms 73 and these arms are connected at their rear portion by a transversely extending member 74. At the rear portion of the transversely extending member 74 are brackets 75 which carry rollers 76 that engage with the track member 9ᶜ which is carried by the depending housing 9 as shown in Fig. 2. Thus it will be seen that the molding mechanism here described is supported with respect to the rotatable head and the central structure which carries the head in precisely the same fashion as heretofore described.

Extending transversely between the arm 73 is a table 76. This table is at its opposite ends pivotally mounted in the arm 73 on bearings such as indicated at 77. The table is capable of turning about its bearings and is in effect a roll-over molding table.

The table 76 is also mounted loosely in its bearings so that it may be jarred when a flask is in place upon the molding table.

The molding mechanism just described is intended to be used in connection with a jarring and elevating table such as the table 60 shown in Fig. 6 and when so used, the table 76 will normally rest upon the table 60.

In proceeding with the use of the molding mechanism just described a pattern is secured to the table 76 and usually provisions made for retaining a flask on the table. When the flask is filled with sand, the table 60 is jarred which carries with it the table 76 and so jars the sand in the mold. After this operation a board is secured over the end of the flask, the central rotatable head is raised by admitting air beneath the piston 7 which of course raises the table 76 away from the table 60. The table 76 is then rolled over and the table 60 may be raised into contact with the board covering the end of the flask, after which the flask is released from the table 76 and the table 60 lowered, thereby drawing the mold from the pattern.

Instead of raising the table 60 as before described, the piston 7 may be lowered until the board secured to the flask, as before described, rests upon the table 60, the flask then released and the rotatable head raised, which will draw the pattern from the mold. The table 76 is then rotated to its original position.

The various molding mechanisms as just described may be rotated by rotating the rotatable head and brought into cooperative relation with other jarring mechanisms, in precisely the same fashion as described in the earlier part of this specification.

Having described our invention, we claim

1. A molding machine comprising a central portion, a head which is rotatable on said central portion and a plurality of molding mechanisms comprising a flask supporting means and a squeezing means associated with said head and movable into different positions as the head is turned.

2. In a molding machine a central portion, a head rotatable upon said central member, said head being provided with a plurality of attachment parts, a plurality of molding mechanisms each comprising a flask supporting means and a squeezing means which are secured to said head through said attachment parts.

3. A molding machine comprising a centrally arranged member, a head rotatably mounted upon said member, a plurality of molding mechanisms each comprising a flask supporting means and a squeezing means carried by said head and movable therewith, a plurality of jarring mechanisms adjacent the central member, the said molding mechanisms carried by the head being successively moved into cooperative position with jarring mechanisms.

4. In a molding machine a central member, a head mounted for rotation upon said central member, means for elevating and lowering the said head, a plurality of molding mechanisms each comprising a flask supporting means and a squeezing means carried by said head and movable to different position by rotation of the head.

5. In a molding machine a central member, a head mounted for rotation upon said central member, means for elevating and lowering the said head, a plurality of molding mechanisms each comprising a flask supporting means and a squeezing means removably carried by said head and movable to different position by rotation of the head.

6. In a molding machine a central member, a head mounted for rotation upon said central member, means for raising and lowering the head, a plurality of molding mechanisms carried by said head and rotatable therewith, a jarring mechanism adjacent said central member, each of said molding mechanisms being successively moved to cooperative position with the jarring mechanism.

7. In a molding machine a central member, a head mounted for rotation on said central member, said head having a plurality of extensions, a plurality of molding mechanisms, each of said molding mechanisms having an extension which cooperates with the extension on the rotatable head whereby the molding mechanism is secured to the head.

8. In a molding machine a central member, a head mounted for rotation on said central member, said head being provided with a plurality of hollow arms, a plurality of molding mechanisms, each of said mechanisms being provided with an extension which cooperates with one of the hollow arms for securing the molding mechanism to the head.

9. In a molding machine a central member, a head mounted for rotation at the upper end of said central member, a plurality of molding mechanisms, means for securing each of the molding mechanisms to the head, and means providing a slidable contact between the central member and the lower portion of each molding mechanism whereby the lower portion of the molding mechanisms are spaced from the central member.

10. In a molding machine a central member, a head mounted for rotation at the upper end of said central member, a plurality of molding mechanisms which are secured to the said head, a trackway carried by the central member adjacent the lower portions of the molding mechanism and means carried by said molding mechanism cooperating with said trackway and thereby spacing the molding mechanism from the vertical member.

11. In a molding machine a central member having a cylinder portion, a piston cooperating with said cylinder, a head rotatably mounted upon said piston and a plurality of molding mechanisms each comprising a flask supporting means and a squeezing means carried by said head and rotatable therewith.

12. In a molding machine a central member having a cylinder portion, a piston within said cylinder, an extension carried by the piston, a rotatable head cooperating with said extension and a plurality of molding mechanisms each mechanism comprising a flask support and a squeezing means carried by said head and rotatable therewith.

13. In a molding machine a central member having a cylinder portion, a piston within said cylinder, a head rotatably mounted at the end of said piston, a plurality of extensions carried by the head, a plurality of molding mechanisms each mechanism comprising a flask support and a squeezing means, each molding mechanism being secured to one of said extensions.

14. In a molding machine a central member having a cylinder portion, a piston within the cylinder, a head rotatably mounted at the end of the piston, a plurality of molding mechanisms carried by the said head and rotatable therewith and means for maintaining the lower ends of said molding mechanisms in spaced relation with respect to the central member.

15. In a molding machine a central member having a piston portion, upright guide members associated with the said cylinder portion, a piston within the cylinder, a housing carried at the end of the piston and depending outside of the cylinder, members carried by said housing which engage with the guides and adapted to slide thereon, a rotatable head mounted upon the piston and a plurality of molding mechanisms carried by the said head and rotatable therewith.

16. In a molding machine a central member having a piston portion, upright guide members associated with the said cylinder portion, a piston within the cylinder, a housing carried at the end of the piston and depending outside of the cylinder, members carried by said housing which engage with the guides and are adapted to slide thereon, a curtain cooperating with the lower portion of said housing, a rotatable head mounted upon the piston and a plurality of molding mechanisms carried by the said head and rotatable therewith.

17. In a molding machine a base member, a cylinder mounted on the base member, a plurality of upright guiding members associated with the cylinder, a piston within the cylinder, a housing supported at one end upon the said piston, members carried by the lower end of said housing and engaging with the said guide members to slide thereon, a head rotatably mounted upon said cylinder, and a plurality of molding mechanisms carried by said head and rotatable therewith.

18. In a molding machine a base member, a cylinder mounted on the base member, a plurality of upright guiding members associated with the cylinder, a piston within the cylinder, a housing supported at one end upon the said piston, members carried by the lower end of said housing and engaging with the said guide members to slide thereon, a curtain, a spring retained roller carried by the base upon which said curtain is mounted, one end of said curtain being attached to the lower end of the said housing, a head rotatably mounted upon said cylinder, and a plurality of molding mechanisms carried by said head and rotatable therewith.

19. In a molding machine a central member having a piston portion, upright guide members associated with the said cylinder portion, a piston within the cylinder, a housing carried at the end of the piston and depending outside of the cylinder, members carried by said housing which engage with the guides and adapted to slide thereon, a rotatable head mounted upon the piston and a plurality of molding mechanisms carried by the said head and rotatable therewith, cooperating means associated with the lower end of each of said molding mechanisms and with the outer portion of said housing for holding the lower ends of the said molding mechanisms in spaced relationship with respect to the housing.

20. In a molding machine, a central member, a head rotatably mounted upon said central member, a body portion of a molding mechanism carried by said head and rotatable therewith, outwardly extending members fixedly secured to the said body portion, pivoted members mounted upon the body portion above the said outwardly extending members, and means for moving said pivoted members.

21. In a molding machine, a central member, a head rotatably mounted upon said central member, a body portion of a molding mechanism carried by said head and rotatable therewith, means mounted adjacent the lower part of the body portion and adapted to support a stripping plate, pivoted means mounted on the body portion and above the stripper plate supporting means, a presser plate carried by said pivoted means, and means for moving the pivoted means about its pivot.

22. In a molding machine, a central member, a head rotatably mounted upon said central member, a body portion of a molding mechanism carried by said head and rotatable therewith, means mounted adjacent the lower part of the body portion and adapted to support a stripping plate, a pair of spaced outwardly extending arms carried by the body portion, a pivoted member mounted on the body portion above said arms, and means for moving the said pivoted member about its pivot.

23. In a molding machine, a central member, a head rotatably mounted upon said central member, a body portion of a molding mechanism carried by said head and rotatable therewith, a pair of spaced outwardly extending arms carried by the body portion, a member pivotally mounted on the body portion above the said arms, a presser plate carried by said pivoted member, and means for moving said pivoted member about its pivot.

24. In a molding machine, a central member, a head rotatably mounted upon said central member, a body portion of a molding mechanism carried by said head and rotatable therewith, a pair of spaced outwardly extending arms carried by the body portion, a pair of pivoted arms mounted upon the body portion and above the first mentioned arms and means for moving the said pivoted arms about their pivot.

25. In a molding machine, a central member, a head rotatably mounted upon said central member, a body portion of a molding mechanism carried by said head and rotatable therewith, outwardly extending members carried by the said body portion adjacent the lower part thereof, a pivoted member carried by the said body portion above the said outwardly extending members, means for adjusting the said pivoted member upon the body portion and means for moving the pivoted member about its pivot.

26. In a molding machine, a central member, a head rotatably mounted upon said central member, a body portion of a molding mechanism carried by said head and rotatable therewith, a pair of outwardly extending arms carried by the body portion adjacent the lower part thereon, an adjustable bearing member carried by said body portion, a member pivotally mounted upon said bearing member and means for moving said pivoted member upon its pivot.

27. In a molding machine, a central member, a head rotatably mounted upon said central member, a body portion of a molding mechanism carried by said head and rotatable therewith, a pair of spaced outwardly extending arms carried by the body portion, bearing members adjustably mounted in the body portion, arms pivotally carried by the bearing members, a presser head associated with said arms and means for moving the arms about their pivots.

28. In a molding machine, a central member, a head rotatably mounted upon said central member, a body portion of a molding mechanism carried by said head and rotatable therewith, a pair of spaced outwardly arms carried by the body portion, a pivoted member carried by the body portion, a piston connected with said pivoted member and a cylinder carried by the body portion with which the piston cooperates.

29. In a molding machine, a central member, a head rotatably mounted upon said central member, a body portion of a molding mechanism carried by said head and rotatable therewith, a pair of spaced outwardly extending arms carried by the body portion, a bearing member adjustably supported in the body portion, a pivoted member pivoted on said bearing member, a rod connected with the member, a piston connected with the rod, a cylinder carried by the body portion and cooperating with the piston, and means for adjusting the position of the cylinder with respect to the piston.

30. A molding mechanism comprising a body portion, a member secured to and extending outwardly from the body portion, a pivoted member pivotally mounted upon the body portion and above the outwardly extending member, means for adjusting said pivoted member with respect to the body portion and means for moving the pivoted member about its pivot.

31. A molding mechanism comprising a body portion, a member extending outwardly from the body portion adjacent the lower part thereof, bearing blocks mounted in the body portion, means for adjusting said bearing blocks with respect to the body portion, a member pivotally supported in the bearing blocks, said pivotally supported member being above the outwardly extending member, and means for moving the pivoted member about its pivot.

32. A molding mechanism comprising a body portion, an outwardly extending member carried by the body portion, a pair of bearing blocks mounted in the body portion, means for adjusting the bearing blocks with respect to the body portion, a pivoted member pivotally supported in the bearing blocks, a piston, means connecting the pivoted member with the piston, a cylinder within the body member and cooperating with the piston and means for adjusting the cylinder with respect to the piston.

33. A molding mechanism comprising a body portion, an outwardly extending member carried by the body portion, bearing blocks mounted in the body portion, means for adjusting said bearing blocks with respect to the body portion, a shaft mounted in the bearing blocks, arms secured to said shaft, a member secured to said shaft, said member being provided with a slot, a pin extending through said slot, a rod secured to said pin, guiding means associated with the body portion and cooperating with the said pin, a rod connected with the said pin, a piston connected with the said rod, a cylinder carried by the body portion and adjustable with respect to the said piston.

34. A molding machine comprising a central portion, a rotatable head mounted thereon, a molding mechanism having an extension removably secured to said rotating head, a body portion of the molding mechanism, arms extending outwardly from said body portion, a molding table extending between the said arms and rotatably mounted upon said arms.

In testimony whereof, we hereunto affix our signatures.

JOHN T. STONEY.
RAYMOND E. STONEY.